United States Patent
Gu et al.

(10) Patent No.: US 10,521,925 B1
(45) Date of Patent: *Dec. 31, 2019

(54) USING MULTIPLE IMAGE VERIFICATION CHALLENGES TO DETERMINE OBJECT LOCATION IN AN IMAGE

(71) Applicant: Google LLC, Mountain View, CA (US)

(72) Inventors: Jiexing Gu, San Jose, CA (US); Ying Liu, Sunnyvale, CA (US); Aaron Malenfant, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,768

(22) Filed: Jun. 4, 2018

Related U.S. Application Data

(63) Continuation of application No. 15/241,951, filed on Aug. 19, 2016, now Pat. No. 10,026,180.

(51) Int. Cl.
| | | |
|---|---|---|
| *G06K 9/00* | (2006.01) | |
| *G06T 7/70* | (2017.01) | |
| *G06T 7/13* | (2017.01) | |
| *H04L 29/06* | (2006.01) | |
| *G06F 3/0484* | (2013.01) | |

(52) U.S. Cl.
CPC ............. *G06T 7/70* (2017.01); *G06T 7/13* (2017.01); *H04L 63/10* (2013.01); *G06F 3/04842* (2013.01); *G06T 2200/24* (2013.01); *G06T 2207/10004* (2013.01)

(58) Field of Classification Search
CPC .................................. G06T 7/13; H04L 63/10
See application file for complete search history.

(56) References Cited

U.S. PATENT DOCUMENTS

| | | |
|---|---|---|
| 7,891,005 B1 | 2/2011 | Baluja et al. |
| 8,132,255 B2 | 3/2012 | Mates |
| 8,607,331 B2 | 12/2013 | Sun et al. |
| 8,621,578 B1 | 12/2013 | Blomquist et al. |
| 8,904,493 B1 | 12/2014 | Dibble |
| 8,910,251 B2 | 12/2014 | Shepard et al. |
| 9,275,215 B2 | 3/2016 | Bailey |
| 9,323,435 B2 | 4/2016 | Thibadeau, Sr. et al. |
| 2008/0244700 A1 | 10/2008 | Osborn et al. |
| 2009/0113294 A1 | 4/2009 | Sanghavi et al. |
| 2009/0235327 A1 | 9/2009 | Jakobsson et al. |
| 2010/0325706 A1 | 12/2010 | Hachey |
| 2013/0145441 A1 | 6/2013 | Mujumdar et al. |
| 2013/0298195 A1 | 11/2013 | Liu et al. |

(Continued)

*Primary Examiner* — Nirav G Patel
(74) *Attorney, Agent, or Firm* — Lerner, David, Littenberg, Krumholz & Mentlik, LLP

(57) ABSTRACT

Multiple image verification challenges can be used to identify the location of an object within an initial image. For instance, a first set of tiles is generated using the initial image. This first set is provided to a client computing device for display in a first verification challenge requesting that the user select tiles including the object. In response, a user selection of tiles of the first set is received. These selected tiles are then used to generate a second set of tiles corresponding to a sub-portion of the initial image. The second set of tiles is provided to a client computing device for display in a second verification challenge. In response to the second verification challenge, a user selection of tiles of the second set is received. This user selection of tiles of the second set is then used to determine a location of the object in the image.

20 Claims, 8 Drawing Sheets

(56) References Cited

U.S. PATENT DOCUMENTS

2014/0123258 A1   5/2014  Guerrero et al.
2016/0239654 A1   8/2016  Johri et al.
2016/0371480 A1  12/2016  Cheung et al.

USING MULTIPLE IMAGE VERIFICATION CHALLENGES TO DETERMINE OBJECT LOCATION IN AN IMAGE

CROSS-REFERENCE TO RELATED APPLICATIONS

The present application is a continuation of U.S. patent application Ser. No. 15/241,951, filed Aug. 19, 2016, the disclosure of which is incorporated herein by reference.

BACKGROUND

In many situations, sophisticated authentication mechanisms are used to discern whether a user requesting access to a network resource is a human or an automated machine, often called a "bot." For example, completely automated public turing tests to tell computers and humans apart ("CAPTCHA") have been used to enhance security measures and prevent automated machines from accessing a particular web-resource. Typical image verification methods involve the display of a plurality of images of objects to the user and a request that the user select one or more of the images that contain objects with a particular characteristic. For instance, an image verification challenge may request that the user select or identify all images of the plurality of images that contain a specific type of object (food, animal, vegetation, etc.). However, some bot programmers have developed ways to answer image verification by identifying the correct images without the need for a user to participate, including using "random guessing" with high volume traffic or using metadata from image search results.

SUMMARY

Aspects of the disclosure provide a method of determining a location of a known object within an image using multiple image verification challenges. The method includes identifying, by one or more computing devices, an initial image including an object, wherein the object is known to be depicted within the image; generating, by the one or more computing devices, a first set of tiles using the initial image, each tile of the first set of tiles including a portion of the initial image; providing, by one or more computing devices, the first set of tiles to a client computing device for display in a first verification challenge requesting selection of tiles that include the object; receiving, by the one or more computing devices, a response to the verification challenge, including user selected tiles of the first set of tiles; using the user selected tiles to generate a second set of tiles that together correspond to a sub-portion of the initial image, each tile of the second set of tiles including a portion of the initial image; providing by the one or more computing devices, the second set of tiles to the client computing device for display in a second verification challenge requesting selection of tiles that include the object; receiving, by the one or more computing devices, a response to the second verification challenge, including user selected tiles of the second set of tiles; and using, by the one or more computing devices, the user selected tiles of the second set of tiles to determine a location of the object in the image.

In one example, the method also includes receiving, by one or more computing devices, a request to engage in the first verification challenge from the client computing device, the request identifying a network resource to which the client computing device is attempting to gain access. In this example, the method also includes providing the client computing device with access to the network resource based on the user selected tiles of the first set of tiles without reference to the user selected tiles of the second set of tiles. In another example, the method also includes modifying the initial image by enlarging a size of the object to create the second set of tiles. In this example, modifying the first image further comprises shifting the location of the object within the initial image to create the second set of tiles. In another example, the method also includes receiving user selection of tiles of the second set of tiles from a plurality of client computing devices, and wherein determining the location is further based on the user selection of tiles of the second set of tiles received from the plurality of client computing devices. In this example, the method also includes, prior to receiving user selection of tiles of the second set of tiles from the plurality of client computing devices, providing the second verification challenge for display to each of the plurality of client computing devices. In another example, the method also includes using the user selected tiles of the second set of tiles to generate a third set of tiles corresponding to a sub-portion of the initial image; providing the third set to a different client computing device for display in a third verification challenge requesting selection of tiles including the object; and receiving, by the one or more computing devices, a response to the third verification challenge, including user selected tiles of the third set of tiles. In this example, determining the location is further based on the user selected tiles of the third set of tiles.

Another aspect of the disclosure provides a system for determining a location of a known object within an image using multiple image verification challenges. The system comprising one or more computing devices having one or more processors configured to identify an initial image including an object, wherein the object is known to be depicted within the image; generate a first set of tiles using the initial image, each tile of the first set of tiles including a portion of the initial image; provide the first set of tiles to a client computing device for display in a first verification challenge requesting selection of tiles that include the object; receive a response to the verification challenge, including user selected tiles of the first set of tiles; use the user selected tiles to generate a second set of tiles that together correspond to a sub-portion of the initial image, each tile of the second set of tiles including a portion of the initial image; provide the second set of tiles to the client computing device for display in a second verification challenge requesting selection of tiles that include the object; receive a response to the second verification challenge, including user selected tiles of the second set of tiles; and use the user selected tiles of the second set of tiles to determine a location of the object in the image.

In one example, the one or more processors are further configured to receive a request to engage in the first verification challenge from the client computing device, the request identifying a network resource to which the client computing device is attempting to gain access. In this example, wherein the one or more processors are further configured to provide the client computing device with access to the network resource based on the user selected tiles of the first set of tiles without reference to the user selected tiles of the second set of tiles. In one example, the one or more processors are further configured to modifying the initial image by enlarging a size of the object to create the second set of tiles. In this example, modifying the first image further comprises shifting the location of the object within the initial image to create the second set of tiles. In one example, the one or more processors are further configured to receive user selection of tiles of the second set of tiles from a plurality of client computing devices, and wherein determining the location is further based on the user selection of tiles of the second set of tiles received from the plurality of client computing devices. In one example, the one or more processors are further configured to receive, prior to receiving user selection of tiles of the second set of tiles from the plurality of client computing devices, provide the second verification challenge for display to each of the plurality of client computing devices. In one example, the one or more processors are further configured to: use the user selected tiles of the second set of tiles to generate a third set of tiles corresponding to a sub-portion of the initial image; provide the third set to a different client computing device for display in a third verification challenge requesting selection of tiles including the object; and receive a response to the third verification challenge, including user selected tiles of the third set of tiles. In this example, determining the location is further based on the user selected tiles of the third set of tiles.

A further aspect of the disclosure provides a non-transitory computer-readable medium storing instructions. The instructions, when executed by one or more processors, cause the one or more processors to perform a method of determining a location of a known object within an image using multiple image verification challenges. The method includes identifying an initial image including an object, wherein the object is known to be depicted within the image; generating a first set of tiles using the initial image, each tile of the first set of tiles including a portion of the initial image; providing the first set of tiles to a client computing device for display in a first verification challenge requesting selection of tiles that include the object; receiving a response to the verification challenge, including user selected tiles of the first set of tiles; using the user selected tiles to generate a second set of tiles that together correspond to a sub-portion of the initial image, each tile of the second set of tiles including a portion of the initial image; providing the second set of tiles to the client computing device for display in a second verification challenge requesting selection of tiles that include the object; receiving a response to the second verification challenge, including user selected tiles of the second set of tiles; and using the user selected tiles of the second set of tiles to determine a location of the object in the image.

In one example, the method also includes receiving, by one or more computing devices, a request to engage in the first verification challenge from the client computing device, the request identifying a network resource to which the client computing device is attempting to gain access. In this example, the method also includes providing the client computing device with access to the network resource based on the user selected tiles of the first set of tiles without reference to the user selected tiles of the second set of tiles. In another example, the method also includes modifying the initial image by enlarging a size of the object to create the second set of tiles. In this example, modifying the first image further comprises shifting the location of the object within the initial image to create the second set of tiles. In another example, the method also includes receiving user selection of tiles of the second set of tiles from a plurality of client computing devices, and wherein determining the location is further based on the user selection of tiles of the second set of tiles received from the plurality of client computing devices. In this example, the method also includes, prior to receiving user selection of tiles of the second set of tiles from the plurality of client computing devices, providing the second verification challenge for display to each of the plurality of client computing devices. In another example, the method also includes using the user selected tiles of the second set of tiles to generate a third set of tiles corresponding to a sub-portion of the initial image; providing the third set to a different client computing device for display in a third verification challenge requesting selection of tiles including the object; and receiving, by the one or more computing devices, a response to the third verification challenge, including user selected tiles of the third set of tiles. In this example, determining the location is further based on the user selected tiles of the third set of tiles.

DETAILED DESCRIPTION

Overview

Figure 1:
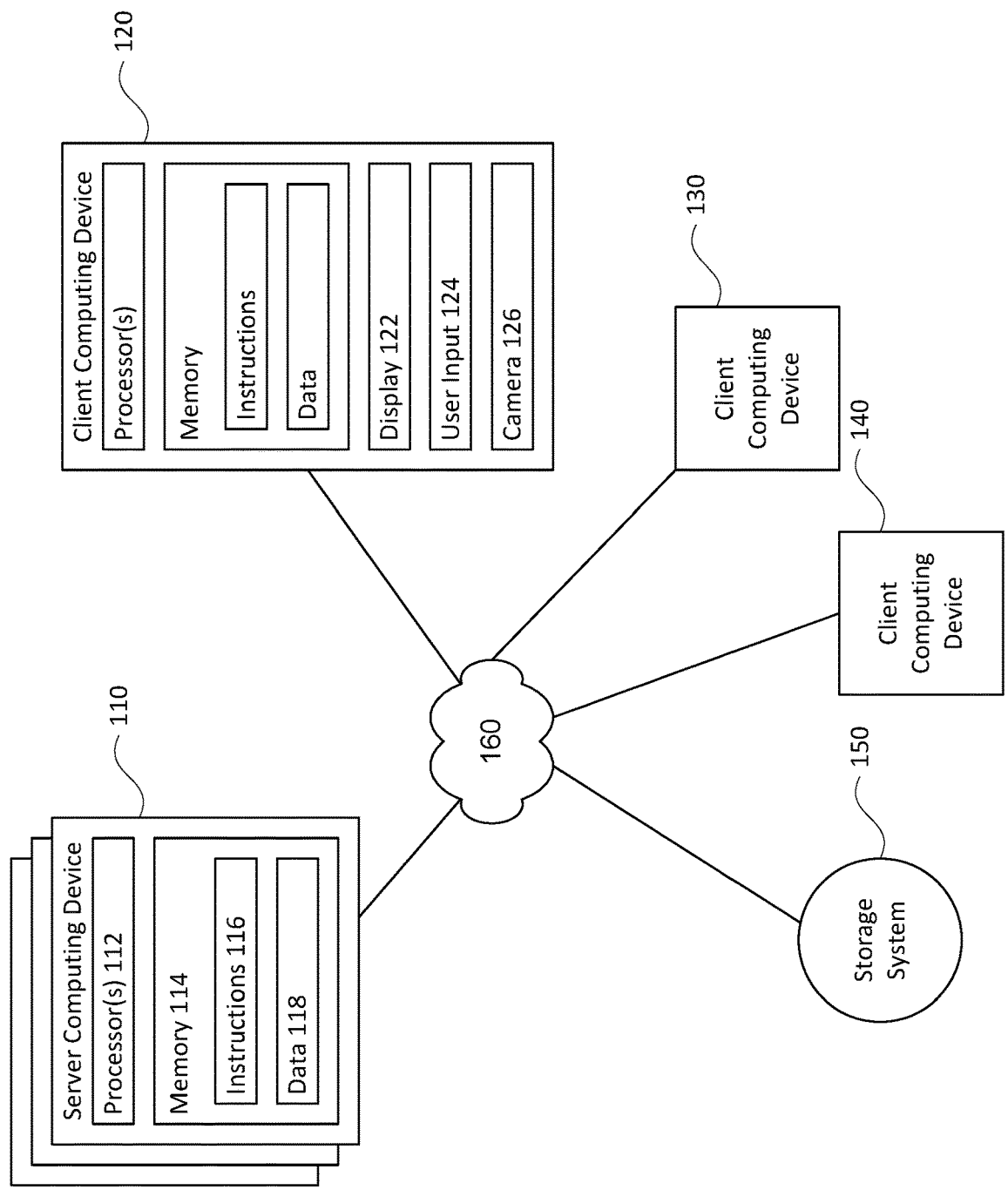
FIG. 1 is a functional diagram of an example system in accordance with aspects of the disclosure.

The present disclosure generally relates to determining the location of an object within an image in response to multiple image verification challenges. For instance, a set of tiles corresponding to an initial image containing an object may be displayed for a first image verification challenge. The challenge may request that a user select or identify all of the tiles that include at least a portion of the object. Thereafter, a new set of tiles corresponding to a sub portion of the initial image may be generated for a second image verification challenge again requesting that the user select or identify all of the tiles that include at least a portion of the object. By doing so, the same user, or in some examples a different user, will be challenged to identify the location of the object in the first set of tiles as well as the location of the same object in the second set of tiles. In addition, by crowdsourcing feedback, the location (or a more exact location) of the object within the initial image, even when the object location in the first and second challenges is initially unknown, can be determined.

A first example of an image verification challenge can require providing at least two sequential image verification challenges to the same user using tiled images. For example, a first location based image verification challenge may generate a first set of image tiles from an initial image including a known object. The initial image is then divided into a plurality of tiles containing partial images that together form the completed or at least some portion of the initial image. The first set of image tiles may be displayed with an image verification challenge requesting that the user identify which of the first set of image tiles include the object. In response, the user may select or otherwise identify the tiles that include the particular object.

Once the tiles are selected by the user, a second location based image verification challenge can be generated. For instance, a new set of tiles can be generated using the user selected tiles from the first image verification challenge. For instance, the initial image may be cropped, zoomed in, or enlarged to focus on the selected tiles thereby enlarging the size of the object in the initial image. The result may then be divided into tiles to create a second set of image tiles. The second set of image tiles may be the same number of image tiles as in the first set or it may differ. A second challenge can be displayed with a request that the user to select the object within the second set of image tiles or even a subportion of the second set of image tiles (such that there are multiple second challenges). Since the first and second image verification challenges have a related context, i.e., include the same object, users will be able to more quickly solve the second image verification challenge.

Crowdsourcing may be used to identify the location of the object in each of the location-based image verification challenges. Based on multiple user responses, the location of the object within the initial image can be ascertained from the different images of the first and second sets of image tiles selected by users. For instance, object location can be determined based upon percentages of selected tiles. Where a high percentage of users selected the same tiles as containing the image of the object, it can be inferred that the tiles with the highest selection percentages are likely to (or actually) contain the image of the object. The results can then be saved into a table that includes labeled locations of the objects within the image. Conversely, tiles not selected by a high percentage of voters may indicate that the object is not located within those tiles.

In addition to enlarging the size of the object within the initial image to generate the second set of images, the location of the object within the initial image may be shifted to determine the location of the outer edges or the boundary of the object within the image. For instance, a progressive series of multiple image verification challenges which zoom and shift the initial image based on previous user tile selections may be used obtain an a more accurate location of an object within the image, including the location of the edges of the object, within the initial image. A consensus based on results of multiple user responses can confirm that the classified object is positioned within a particular subset of the tiles of the first set of tiles.

The progressive series of multiple image verification challenges may begin with a set of tiles corresponding to an entire initial image with an object located at an approximate center of the initial image. Once tiles are selected users from the first verification challenge, a second image verification challenge can be initiated. In the second image verification challenge, the location of the particular object within the set of image tiles can be modified by zooming in on the initial image in order to enlarge the object. A second image verification challenge can be provided to users. A consensus of users selecting the tiles containing the object would verify the location of the object.

Building from the results of a prior multiple image verification challenge, a new or other two-step location based image verification challenges can be issued to different users to more accurately determine the boundaries of the particular object. The image from the last image verification challenge can be further modified, by enlarging the object. Still further challenges can be generated by shifting the object in different directions. Based on these crowdsourcing results, a more accurate estimate or determination of the location of the edges of the object can be determined.

Rather than enlarging the size of an object and creating new tiles, the set of tiles may remain consistent over multiple image verification challenges. For instance, an initial image may be divided into a set of tiles, and thereafter "cropped" by selecting a first subset of the tiles corresponding to central portion of the initial image. As an example, a predetermined "window" may be aligned with the tiles to select the first subset of tiles for a first image verification challenge. Once users have confirmed the location of the one or more objects in the subset of image tiles of the first image verification challenge, the central portion of the image, or the subset of image tiles, can be considered a first confident subset of tiles.

With the identification of confident subset of tiles, the computing device can shift the window by at least one row of tiles to obtain a second subset of tiles. For instance, the window can be shifted upward by a row of tiles, downward by a row of tiles, and laterally by a row of tiles. Once the image has been shifted, another image verification challenge can be initiated. As with the first subset of tiles, the second subset of tiles may become a second subset of confident tiles using user answers based upon the modified first image. Subsequent image verification challenges can be provided and the window further shifted in various directions until all of the tiles are included in a confident subset tiles and the locations of all of the known objects of the initial image can be determined.

The features described herein allow for more secure image verification challenges as well as leverage user responses to determine the location of one or more objects within an image. Crowdsourcing can be used to provide accurate location information, as opposed to reliance on machine generated bounding boxes, which are inconsistent and produce incorrect results. Since the use of machine-generated bounding boxes to identify object location within an image does not generate accurate results, crowdsourcing user provided selections of tiles which contain the object can be used to accurately identify and confirm object location within the image. Moreover, requiring users to identify location of an object within an image in multiple image verification challenges, as well as using street view images from street view data as the initial image, provides enhanced security measures. Such methods make it difficult for automated machines to use random guess or searching metadata to determine the location of an object within an image or rather, which tiles of a set of tiles to select.

Example Systems

Figure 2:
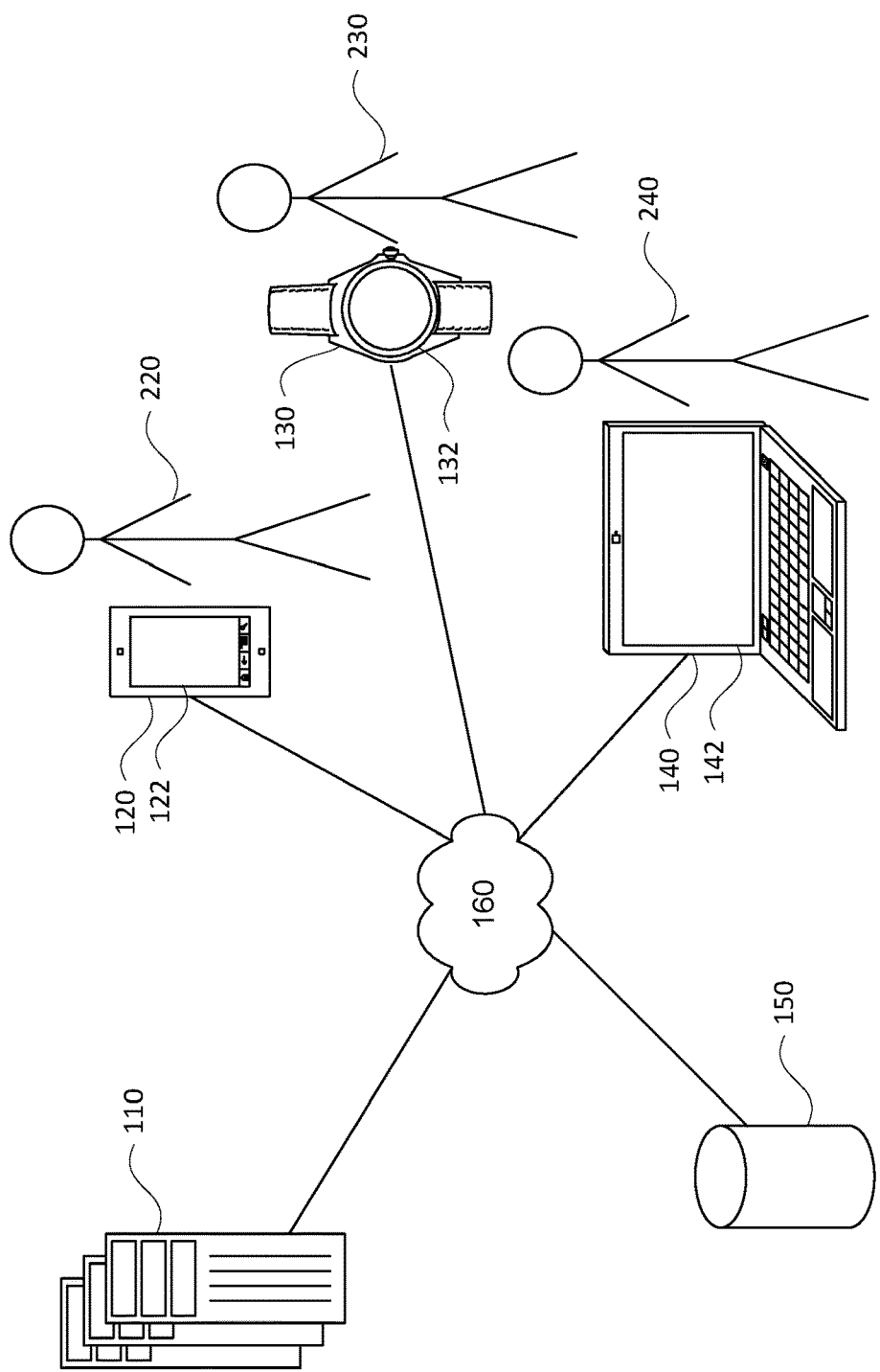
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each computing device 110 can contain one or more processors 112, memory 114 and other components typically present in general purpose computing devices. Memory 114 of each of computing devices 110, 120, 130, and 140 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices 120, 130, and 140 may be configured similarly to the server computing devices 110, with one or more processors, memory and instructions as described above. Each client computing device 120, 130, or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen, or microphone). The client computing device may also include a camera 126 for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Storage system 150 may store network resources. As an example, these network resources may include private files, email accounts, banking or other commerce accounts, social media accounts, private websites, private networks, etc. which require some level of security to avoid being accessed by automated machines (i.e. the "bots" discussed above).

Storage system 150 may store various images. These images may include images. As discussed herein, at least some of these images may be "initial images" used to generate image verification challenges. In some instances, these initial images may be selected or identified in order to reduce the likelihood of automated machines "cheating" the image verification challenges. For instance, the initial images may include street level images or street views collected by cameras mounted on vehicles (cars or bicycles) or carried by persons as the cameras are moved along a street. The initial images may include only a subset of these street view images which are not publicly searchable. This obviates the ability of automated machines to use metadata regarding the street views in order to "guess" at object location. These images can be cropped to reduce the likelihood of overlap between the object and the tiles and ensure that the image contains at least one object.

Object view code boxes can be incorporated into the image label to identify certain objects. For instance, using image analysis and machine learning, objects can be detected in images. While not very accurate, confidence values can be combined with information from human operators to increase the accuracy of object view code boxes. Also, feedback from other types of image CAPTCHA challenges can be used. The images may or not be cropped before asking a human operator to the images including a particular type of object. In addition or alternatively, human operators can label images "by hand" without any prior knowledge of the image content. Such tasks should only be sent to trusted human operators and limited to a known set of users to avoid the possibility. The resulting object view code boxes can be used as an initial estimate of the location of an object within an initial image. This initial estimate, as well as any later refinements as discussed below, may be associated with the initial image and stored in the storage system 150.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

A user, such as user 220, may use his or her client computing devices, such as client computing devices 120, 130, or 140 to send a request to the server computing devices 110 to access a network resource. As noted above, the network resource may include private files, email accounts, banking or other commerce accounts, social media accounts, private websites, private networks, etc.

Figure 3A:
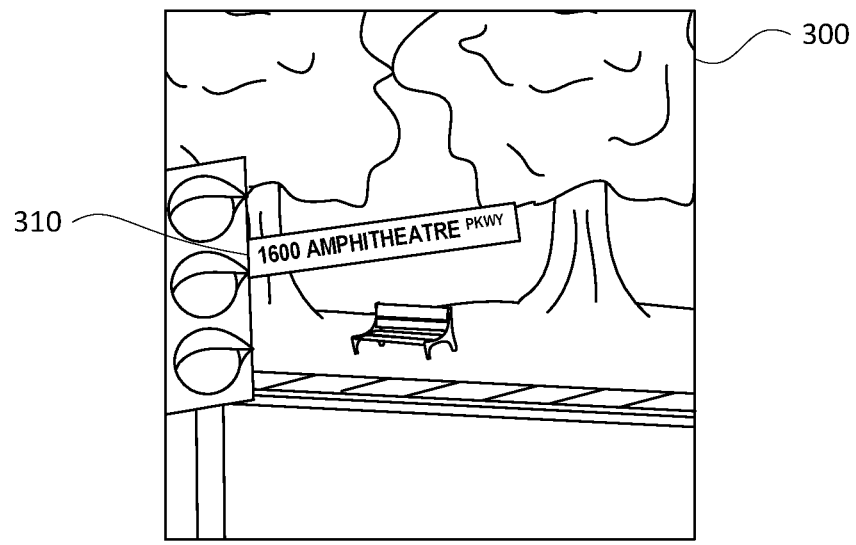
FIG. 3A is an example initial image in accordance with aspects of the disclosure.

As noted above, in response to a request from a client computing device to access a network resource, the server computing devices may generate and provide an image verification challenge. To do so, the server computing devices must first identify an initial image. For instance, the server computing devices 110 may access the storage system 150 to retrieve an image having associated data which identifies an object depicted in the image. This image may be an "initial" image which is used to generate a set of tiles. FIG. 3A is an example of an initial image 300 including a street sign 310. In this regard, image 300 may be stored in storage system 150 with associated information or metadata identifying that image 300 includes a street sign object an initial estimate for the location of the street sign, for instance somewhere near the center of the initial image. However the exact location of street sign 310 within initial image 300 may at least initially be unknown to the server computing devices 110 or otherwise not included in the storage system 150.

Figure 3B:
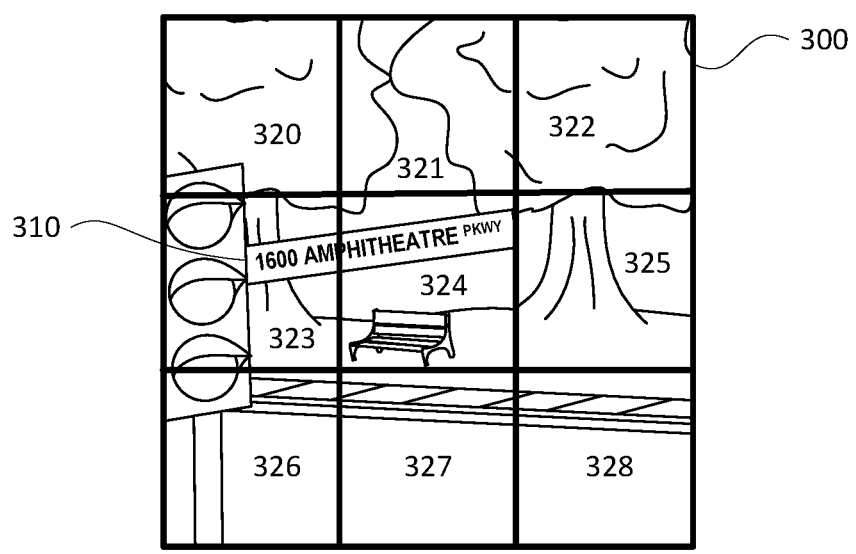
FIG. 3B is an example first set of tiles for the initial image of FIG. 3A in accordance with aspects of the disclosure.

The tiles may be generated by simply dividing the image into a plurality of squares or rectangles each corresponding to one tile. In other words, each tile contains a sub-portion of the initial image. As shown in FIG. 3B, initial image 300 is divided into 9 tiles 320-328. More tiles, such as 16 (4×4) or 25 (5×5), may also be used, but the greater the number of tiles, the more difficult the experience for a user, and of course too few tiles may not provide sufficient information about the location of the object in the initial image. Returning to FIG. 3B, together, tiles 320-328 form the completed initial image, though in some examples, the first set of tiles may cover only a portion of the initial image.

The first set of image tiles may be displayed with a first image verification challenge requesting that the user identify which of the first set of image tiles include the object. In response, the user may select or otherwise identify the tiles that include the object. For instance, the tiles 320-328 may be displayed as shown in FIG. 3B (though without reference numerals 320-328) with textual and/or audio information requesting that the user select all of the tiles that include a "street sign" (the object known to be depicted in initial image 300). In response, the user may select a subset of the tiles, here tiles 323 and 324 that include street sign 310.

If the selected tiles correspond to the initial guess at where the object is located in the image, the user may have "passed" the first image verification challenge. However, in order to leverage the user's selection of tiles and the request to access the network resource, a second image verification challenge may be generated immediately to better refine the estimate of the location of the object. This second image verification challenge may have no effect on whether the user's client computing device is actually granted access to the network resource.

Figure 3C:
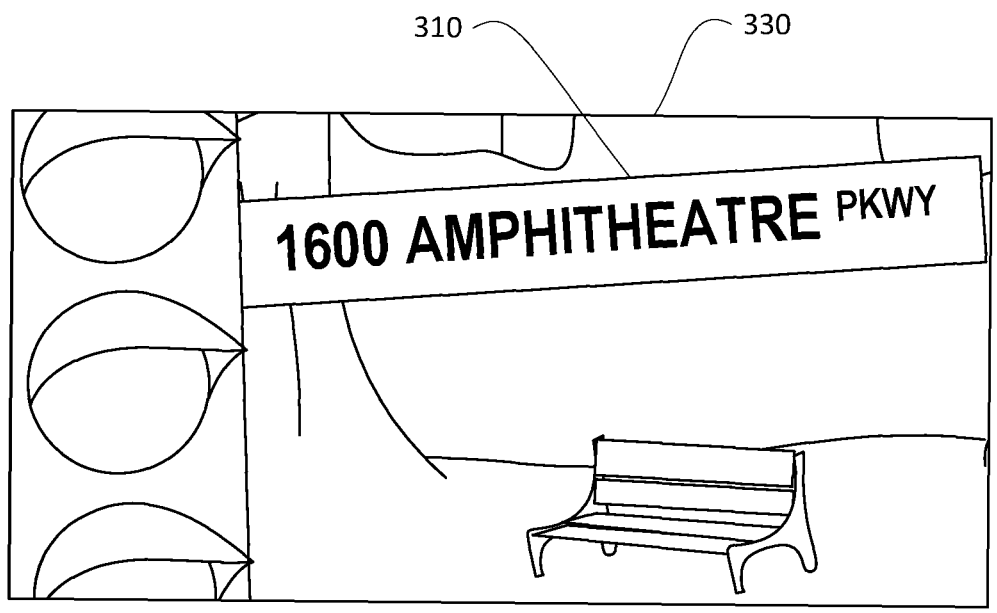
FIG. 3C is an example of a portion of the initial image of FIG. 3A in accordance with aspects of the disclosure.

As noted above, once the tiles are selected by the user, a second location based image verification challenge can be generated. For instance, the initial image may be cropped, zoomed in, or enlarged to focus on a region of the initial image that includes all of the selected tiles. In this regard, the region may include some areas or tiles that were not selected by the user in order to create a square or rectangular region suitable for division into tiles. FIG. 3C is an example of the user selected tiles from a first verification challenge corresponding to tiles 323 and 324 of FIG. 3B. In this example, the selected tiles may correspond to a cropped or zoomed in region 330 of the initial image 300. Thus, the size of the street sign in the initial image is enlarged as compared to initial image 300.

The resulting image of this zooming and cropping to include each of the user selected tiles may then be divided into tiles to create a second set of image tiles. For instance, turning to FIG. 3D, region 330 is divided into 18 tiles 340-357. The second set of image tiles may be the same number of image tiles as in the first set or it may differ, for instance dependent upon the shape and size of the tiles and region. In this regard, the 18 tiles may be further subdivided into two sets (tiles 340-342, 346-348, and 352-354 being a first set, and tiles 343-345, 349-351, and 355-357 being a second set).

Figure 3D:
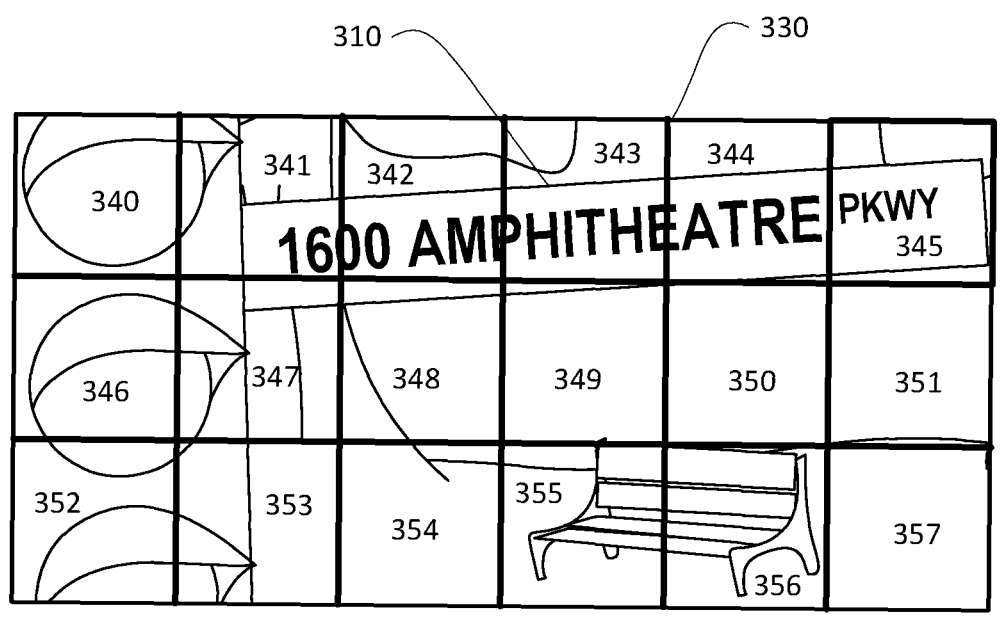
FIG. 3D is an example second set of tiles for the portion of the initial image of FIG. 3C in accordance with aspects of the disclosure.

The second set of image tiles (or at least one of the subsets) may be displayed with a second image verification challenge requesting that the user identify which of the second set of image tiles include the object. In response, the user may select or otherwise identify the tiles that include the object. For instance, the tiles 340-357 may be displayed as shown in FIG. 3D (though without reference numerals 340-357) with textual and/or audio information requesting that the user select all of the tiles that include a "street sign" (the object known to be depicted in the initial image 300). In response, the user may select a subset of the tiles, here tiles 341-45, 347 and 348 that include street sign 310. Since the first and second image verification challenges have a related context, i.e., include the same object, users will be able to more quickly solve the second image verification challenge. Alternatively, tiles 340-342, 346-348, 352-354 may be displayed to a first user as a second image verification challenge, and tiles 343-345, 349-351, and 355-357 may be displayed to a second user as a second image verification challenge. In this example, both the first and second user may have (or may not have) responded to the first image verification challenge with tiles 320-328 as discussed above.

Crowdsourcing may be used to identify the location of the object in each of the location-based image verification challenges. Based on multiple user responses, the location of the object within the initial image can be ascertained from the different images of the first and second sets of image tiles selected by users. For instance, object location can be determined or refined based upon percentages of selected tiles. Where a high percentage, for instance greater than 50% of users selected the same tiles, for instance tiles 341-45 of FIG. 3D, as containing the image of the object, it can be inferred that these tiles are likely to (or actually) contain the object, here a street sign. Thus, the locations of these tiles relative to the initial image may be stored with the initial image in storage system 150 as the determined location or refined location for the object, here street sign 310. Conversely, tiles not selected by a high percentage of voters, such as tiles 352 and 357, may indicate that the object is not located within those tiles.

In addition to enlarging the size of the object within the initial image to generate the second set of images, the location of the object within the initial image may be shifted to determine the location of the outer edges or the boundary of the object within the image. For instance, a progressive series of multiple image verification challenges which zoom and shift the initial image based on previous user tile selections may be used obtain an a more accurate location of an object within the image, including the location of the edges of the object, within the initial image. A consensus based on results of multiple user responses can confirm that the classified object is positioned within a particular subset of the tiles of the first set of tiles.

For instance, FIGS. 4A-4F are an example of a progressive series of sets of tiles for different image verification challenges. These challenges may be shown in sequence to different users, such that a first user receives the images of FIGS. 4A and 4B, a second user receives the images of FIGS. 4B and 4C (after a minimum number of users have selected tiles from the images of FIGS. 4A and 4B), and so on. As an example, the minimum number of users may include 5, 10, or more or less users. In addition or alternatively, these challenges may be shown in different orders, by skipping images, etc.

Figure 4A:
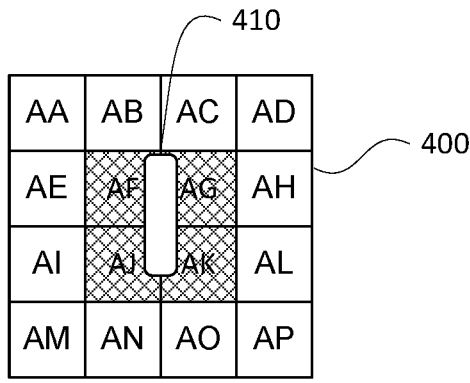
FIGS. 4A-4F are an example of sets of tiles for progressive multiple image verification challenges using an initial image.

FIG. 4A is an example of an initial image 400. Initial image 400 is associated with information and/or metadata identifying a known object 410 and an estimate that the location of the object is proximate to the center of the initial image (as determined from the information of storage system 150). Although the initial estimate is helpful, it is not required and can be inferred from prior image verification challenges as discussed below. Initial image 400 is divided into 16 tiles (AA-AP). This first set of tiles may be displayed with a request that the user select the tiles including the known object 410. This image verification challenge may be displayed to a plurality of users, for instance 10 or more or less. The shaded tiles of FIG. 4A indicate tiles likely to be selected by users, here 4 tiles 1F, 1G, 1J and 1K. When a high percentage of at least a minimum number users, for instance 80% or 90% (of 5, 10 or more or less users), have selected the same or an overlapping subset of the first set of tiles, these selected tiles may be used to generate a second image verification challenge for the initial image 400.

Figure 4B:
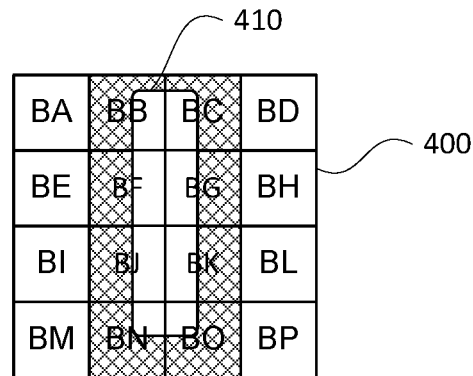

The second image verification challenge may be generated by zooming in or out, cropping, and/or shifting the selected tiles. For instance, FIG. 4B depicts a portion 420 of the initial image generated by zooming in on the selected tiles while maintaining the same aspect ratio as the initial image 400. Here the zoom level is 200%. This new image is then divided into a second subset of 16 tiles (BA-BP) that may be displayed with a request that the user select the tiles including the known object 410 as a second verification challenge. The cross-shaded tiles of FIG. 4B indicate tiles likely to be selected by users, here 8 tiles 2B, 2C, 2F, 2G, 2J, 2K, 2N, and 2O. When a high percentage of the minimum number of users (for instance 5, 10 or more or less users), have selected the same or an overlapping subset of the first set of tiles, this information may provide a good estimate of the height of the object 410. In addition, these selected tiles may be used to generate another progressive image verification challenge for the initial image 400.

Figure 4C:
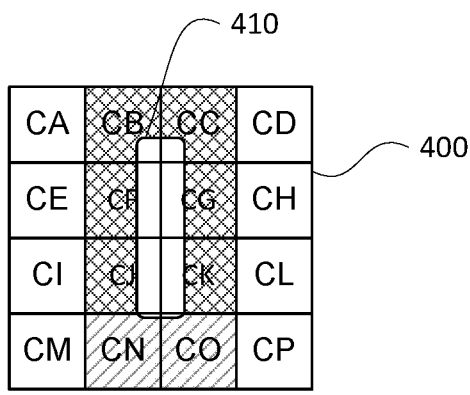

For instance, FIG. 4C depicts a portion 430 of the initial image generated by zooming out from portion 420 or zooming into image 400 while maintaining the same aspect ratio as the initial image 400. Here the zoom level is 150% from the initial image, zooming out may provide additional area for shifting later. This set of tiles (CA-CP) may be displayed with a request that the user select the tiles including the known object 410. This image verification challenge may be displayed to a plurality of users, for instance 10 or more or less. The cross-shaded tiles of FIG. 4C indicate tiles likely to be selected by users, here 6 tiles: CB, CC, CF, CG, CJ, and CK. Diagonally-shaded tiles 3N and 3O indicate tiles that overlap with user selected tiles from FIGS. 4A and 4B, but are not likely to be selected from the set of tiles in FIG. 4C, as tiles CN and CO do not contain, or are very close to the edge of the object 410. When a high percentage of at least a minimum number users, for instance 80% or 90% of 5, 10 or more or less users, have selected the same or an overlapping subset of the first set of tiles, these selected tiles may be used to generate a further image verification challenge for the initial image 400.

Figure 4D:
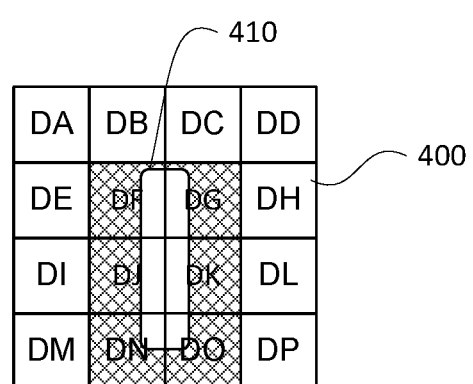
Figure 4E:
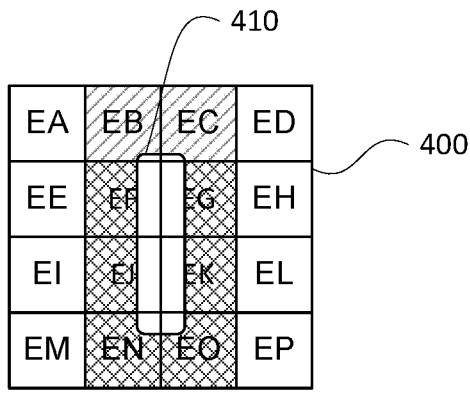
Figure 4F:
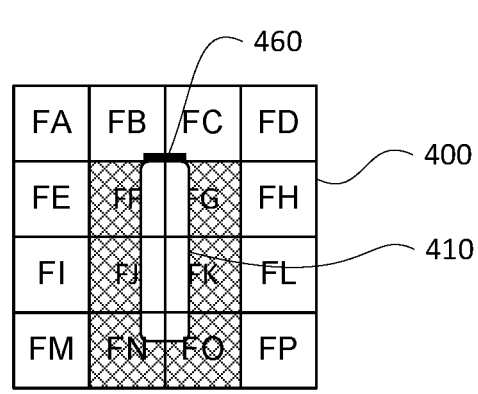

FIG. 4D-4F depict examples of sets of tiles generated by shifting portion 430 of the initial image in different directions in order to get a better estimate of the upper edge of the object. For instance, between FIGS. 4C and 4D, the portion 430 is shifted upwards, relative to initial image 400, 0.5 of a tile to obtain portion 440 (the object is shifted downwards). The half tile at the bottom of the portion 430 that is lost can be filled with information from the initial image to maintain the same aspect ratio as the initial image and tile size. The 16 tiles (DA-DP) of portion 440 may then be used for a further image verification challenge.

The cross-shaded tiles of FIG. 4D indicate tiles likely to be selected by users, here 6 tiles: DF, DG, DJ, DK, DN, and DO. When no one or a small portion (i.e. 20% or less) of the minimum number of users (for instance 5, 10 or more or less users) are selecting the upper tiles DB and DC of FIG. 4D, the portion 440 may be shifted downward, relative to initial image 400, 0.25 of a tile to obtain portion 450 as in FIG. 4E for another image verification challenge.

The cross-shaded tiles of FIG. 4E indicate tiles likely to be selected by users, here 6 tiles: EF, EG, EJ, EK, EN, and EO. Diagonally-shaded tiles EB and EC indicate tiles that overlap with user selected tiles from FIGS. 4A-4D, but are not likely to be selected from the set of tiles in FIG. 4E, as tiles EB and EC do not contain, or are very close to the edge of the object 410. Where a small portion (i.e. 20% or less) of the minimum number of users (for instance, 5, 10 or more or less users) are not selecting EB and EC, an even smaller downward shift may be added (i.e. 0.125) in order to obtain portion 460 of FIG. 4F. The 16 tiles (FA-FP) of portion 460 may then be used for a further image verification challenge.

Eventually, this process of shifting and zooming may provide a highly accurate estimate of the upper edges of the object. For instance, the difference between a selected box and an unselected box (FB and FF) can be used to identify an almost exact upper edge 470 of object 410.

Similar zooming and shifting can be used to determine other edges of the object in the initial image. In addition to shifting, the portions can also be rotated relative to the initial image to provide even greater accuracy where edges are not necessarily parallel to the bounds of the tiles. Moreover, additional shifting and/or rotating in smaller degrees can be used to provide greater accuracy on the edge location, but of course, this may require generating many more image verification challenges. The end result is a highly accurate estimate of the location of the object within the initial image which can be associated with the initial image and the associations stored in storage system 150.

Figure 5A:
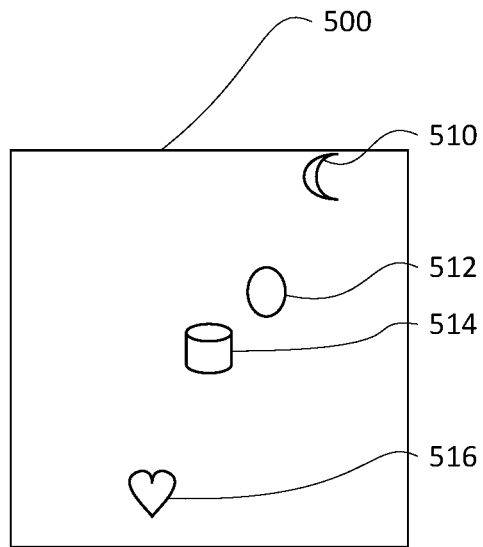
FIG. 5A is an example initial image in accordance with aspects of the disclosure.
Figure 5B:
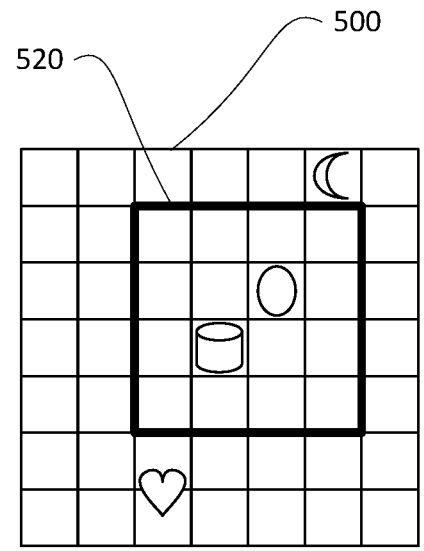
FIG. 5B is an example of a window and subset of tiles of the initial image of FIG. 5A in accordance with aspects of the disclosure.

Rather than enlarging the size of an object and creating new tiles, the set of tiles may remain consistent over multiple image verification challenges. For instance, an initial image may be divided into a set of tiles, and thereafter "cropped" by selecting a first subset of the tiles corresponding to central portion of the initial image. FIG. 5A depicts an initial image 500 including a plurality of known objects 510-16. As shown in each of these FIGURES, initial image 500 is divided into 49 tiles (7×7). A predetermined "window" may be aligned with the tiles to select the first subset of tiles for a first image verification challenge. As shown in FIG. 5B, window 520 is overlaid on 16 tiles (in other words, window 520 is 4×4 tiles). These 16 tiles make up a first set of tiles for a first image verification challenge. In this example, the first set of tiles is a subset of the tiles of initial image 500.

Figure 5C:
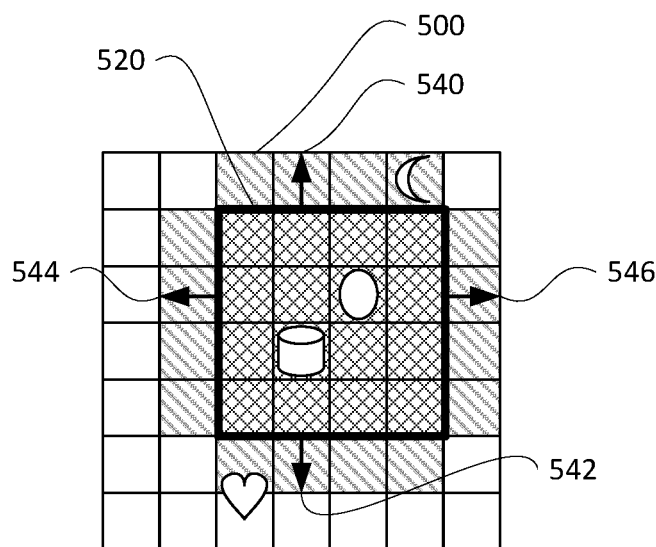
FIG. 5C is an example of a confident subset of tiles of the initial image of FIG. 5A and shifting directions in accordance with aspects of the disclosure.

Once users have confirmed the location of the one or more objects in the subset of image tiles of the first image verification challenge, the central portion of the image, or the subset of image tiles, can be considered a first confident subset of tiles. Thus, in the example of FIG. 5C, the cross-shaded tiles correspond to confident tiles. The locations of objects within these confident tiles can then be determined or refined as the case may be.

With the identification of confident subset of tiles, the computing device can shift the window by at least one row of tiles to obtain a second subset of tiles. For instance, the window can be shifted upward by a row of tiles, downward by a row of tiles, and laterally (left or right relative to the page) by a row of tiles as shown by arrows 540-46 and the diagonally-shaded boxes of FIG. 5C.

Figure 5D:
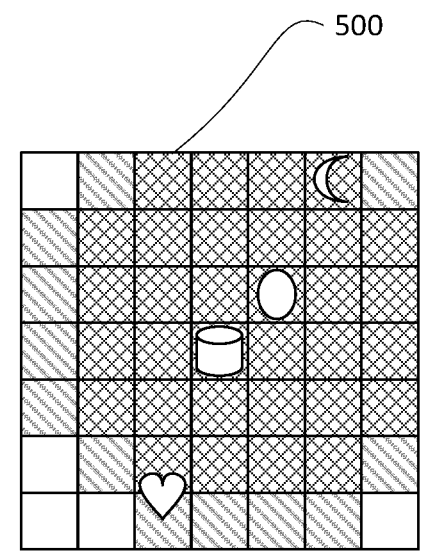
FIG. 5D is an example of a confident subset of tiles of the initial image of FIG. 5A and shifting directions in accordance with aspects of the disclosure.

Once the image has been shifted, another image verification challenge can be initiated using the subset of tiles included in the shifted window. As with the first subset of tiles, this second subset of tiles may become a second subset of confident tiles once a minimum number of users (5, 10 or more or less) have selected tiles including the known objects. Subsequent image verification challenges can be provided and the window further shifted in various directions, as shown in FIG. 5D, until all of the tiles of the initial image are included in a confident subset of tiles and the locations of all of the known objects of the initial image can be determined. Again, these locations of these objects can then be associated with the initial image and the associations stored in the storage system 150.

Figure 6A:
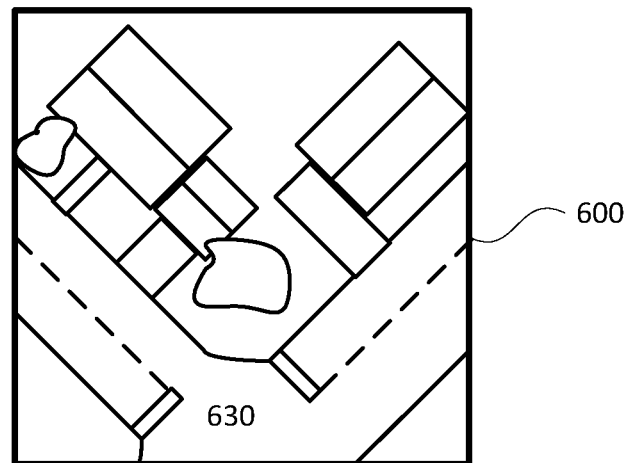
FIG. 6A is an example initial image in accordance with aspects of the disclosure.
Figure 6B:
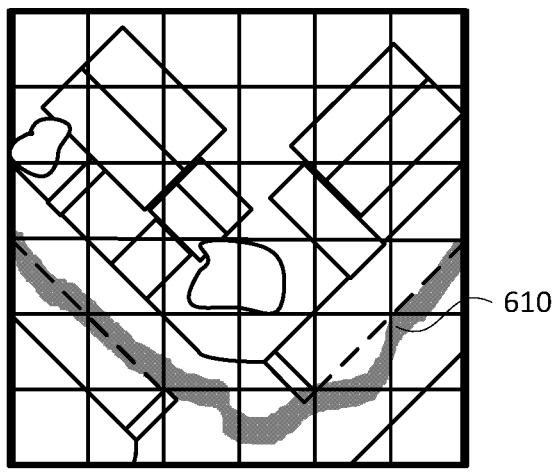
FIGS. 6B and 6C are example tracings in accordance with aspects of the disclosure.
Figure 6C:
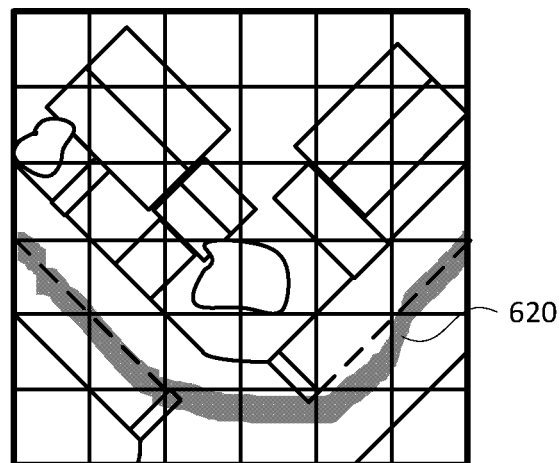

Various methods can be implemented for a user to identify or select a tile. For instance, a user may directly select the tiles containing the object or highlight the boundary of an object by drawing or tracing the outer perimeter of the object. The drawing, tracing, and/or selecting can be accomplished by a mouse, a pen or stylus, or a user's finger. The result is that a highlighted boundary around the object "selects" all tiles that cross or are included within the boundary. In addition to larger objects, some objects that appear as lines or other shapes may also be more readily selected or identified by a user through tracing. For instance, FIGS. 6B and 6C are examples of user tracings 610, 620 for an object corresponding to a particular roadway 630 in an image 600 depicted in FIG. 6A. In this example, the tiles through which the tracings cross are the user selected tiles. In that way, the image 600 need not actually be displayed with the tiles.

Figure 7:
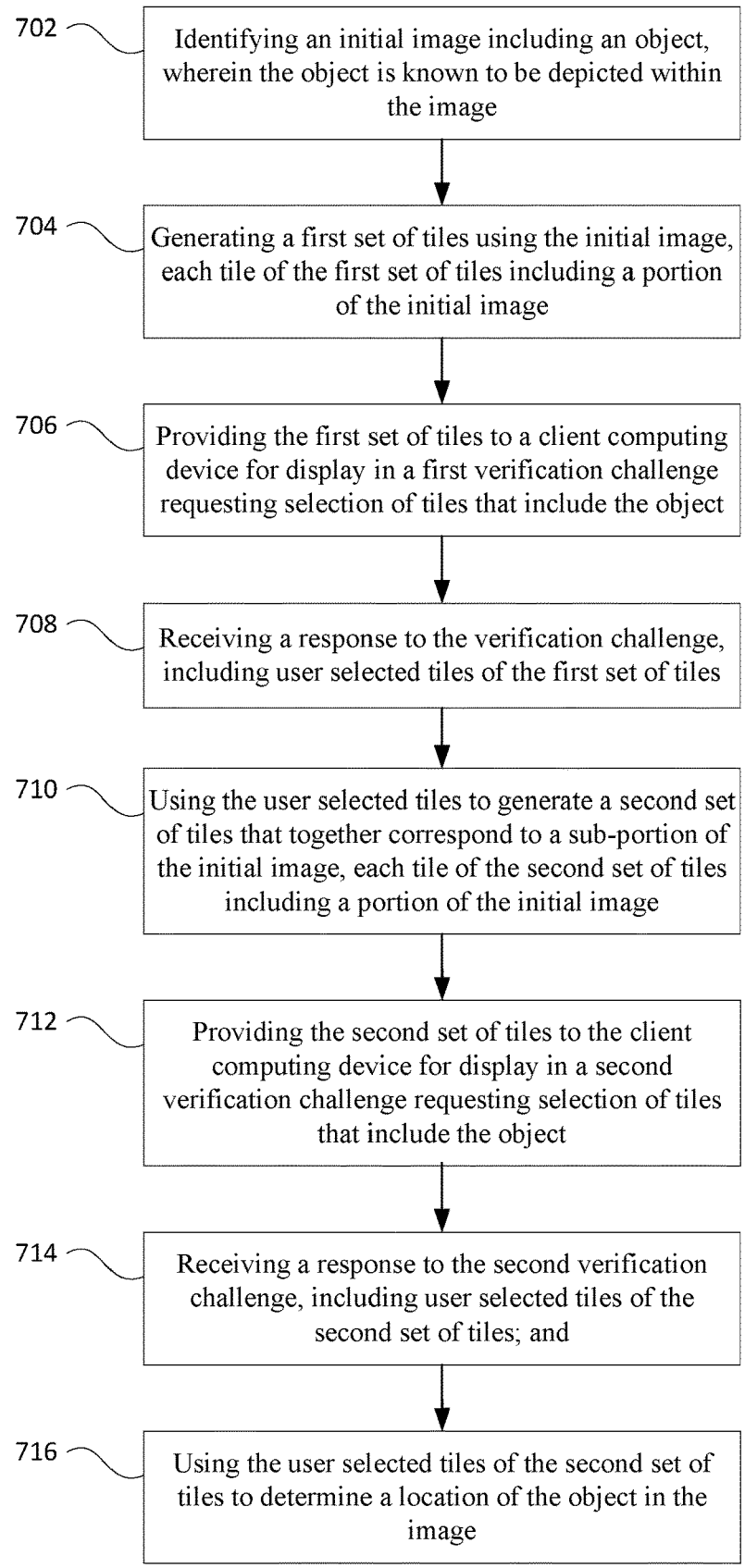
FIG. 7 is a flow diagram in accordance with aspects of the disclosure.

Flow diagram 700 of FIG. 7 is an example flow diagram of some of the aspects described above that may be performed by one or more computing devices such as server computing devices 110 in order to determine a location of a known object within an image using multiple image verification challenges. In this example, at block 702 an initial image including an object is identified. The object is known to be depicted within the image. At block 704, a first set of tiles is generated using the initial image. Each tile of the first set of tiles including a portion of the initial image. The first set of tiles is provided to a client computing device for display in a first verification challenge requesting selection of tiles that include the object at block 706. A response to the verification challenge, including user selected tiles of the first set of tiles, is received at block 708. The user selected tiles are then used to generate a second set of tiles that together correspond to a sub-portion of the initial image at block 710. Each tile of the second set of tiles including a portion of the initial image. The second set of tiles is provided to the client computing device for display in a second verification challenge requesting selection of tiles that include the object at block 712. A response to the second verification challenge, including user selected tiles of the second set of tiles, is received at block 714. The user selected tiles of the second set of tiles are used to determine a location of the object in the image at block 716.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining a location of a known object within an image using multiple image verification challenges, the method comprising:
   identifying, by one or more processors, an initial image including an object;
   identifying, by the one or more processors, a first subset of at least two or more tiles of a first set of tiles, each tile of the first set of tiles including a first sub-portion of the initial image;
   using, by the one or more processors, the first subset to generate a second subset of tiles including at least two or more tiles that together correspond to a second sub-portion of the initial image, each tile of the second set of tiles including a sub-portion of the second sub-portion of the initial image;
   providing, by the one or more processors, the second subset to a client computing device for display in a verification challenge requesting selection of tiles that include the object;
   receiving, by the one or more processors, a response to the verification challenge, including user selected tiles of the second subset; and
   using, by the one or more processors, the user selected tiles of the second subset to determine a location of the object in the image.

2. The method of claim 1, wherein the first subset is identified based on whether the first subset has been selected by a minimum number of users.

3. The method of claim 1, wherein generating the second subset of tiles includes zooming into the image based on the first subset.

4. The method of claim 3, wherein generating the second subset includes dividing a zoomed in area of the image into the second subset.

5. The method of claim 3, wherein the zooming includes maintaining an aspect ratio of the initial image.

6. The method of claim 1, wherein generating the second subset of tiles includes zooming out of at least one of the first subset of tiles.

7. The method of claim 1, wherein generating the second subset of tiles includes cropping of at least one of the first subset of tiles.

8. The method of claim 1, wherein generating the second subset of tiles includes shifting at least one of the first subset of tiles.

9. The method of claim 8, wherein the shifting is based on a minimum number of users selecting tiles of the first subset.

10. The method of claim 8, wherein the shifting includes shifting away from one or more tiles based on whether the one or more tiles were selected by a percentage of the minimum number of users.

11. The method of claim 8, wherein the shifting includes shifting away from one or more tiles based on whether the one or more tiles were selected any users.

12. A system for determining a location of a known object within an image using multiple image verification challenges, the system comprising one or more processors configured to:
   identify an initial image including an object;
   identify a first subset of at least two or more tiles of a first set of tiles, each tile of the first set of tiles including a first sub-portion of the initial image;
   use the first subset to generate a second subset of tiles including at least two or more tiles that together correspond to a second sub-portion of the initial image, each tile of the second set of tiles including a sub-portion of the second sub-portion of the initial image;
   provide the second subset to a client computing device for display in a verification challenge requesting selection of tiles that include the object;
   receive a response to the verification challenge, including user selected tiles of the second subset; and
   use the user selected tiles of the second subset to determine a location of the object in the image.

13. The system of claim 12, wherein the one or more processors are further configured to generate the second subset of tiles by zooming into the image based on the first subset.

14. The system of claim 13, wherein the one or more processors are further configured to generate the second subset includes dividing a zoomed in area of the image into the second subset.

15. The system of claim 13, wherein the one or more processors are further configured to generate zoom by maintaining an aspect ratio of the initial image.

16. The system of claim 12, wherein the one or more processors are further configured to generate the second subset of tiles by zooming out of at least one of the first subset of tiles.

17. The system of claim 12, wherein the one or more processors are further configured to generate the second subset of tiles by cropping of at least one of the first subset of tiles.

18. The system of claim 12, wherein the one or more processors are further configured to generate the second subset of tiles by shifting at least one of the first subset of tiles.

19. The system of claim 18, wherein the one or more processors are further configured to shift based on a minimum number of users selecting tiles of the first subset.

20. The system of claim 18, wherein the one or more processors are further configured to shift by shifting away from one or more tiles based on whether the one or more tiles were selected by a percentage of the minimum number of users.

\* \* \* \* \*